2,717,860
Patented Sept. 13, 1955

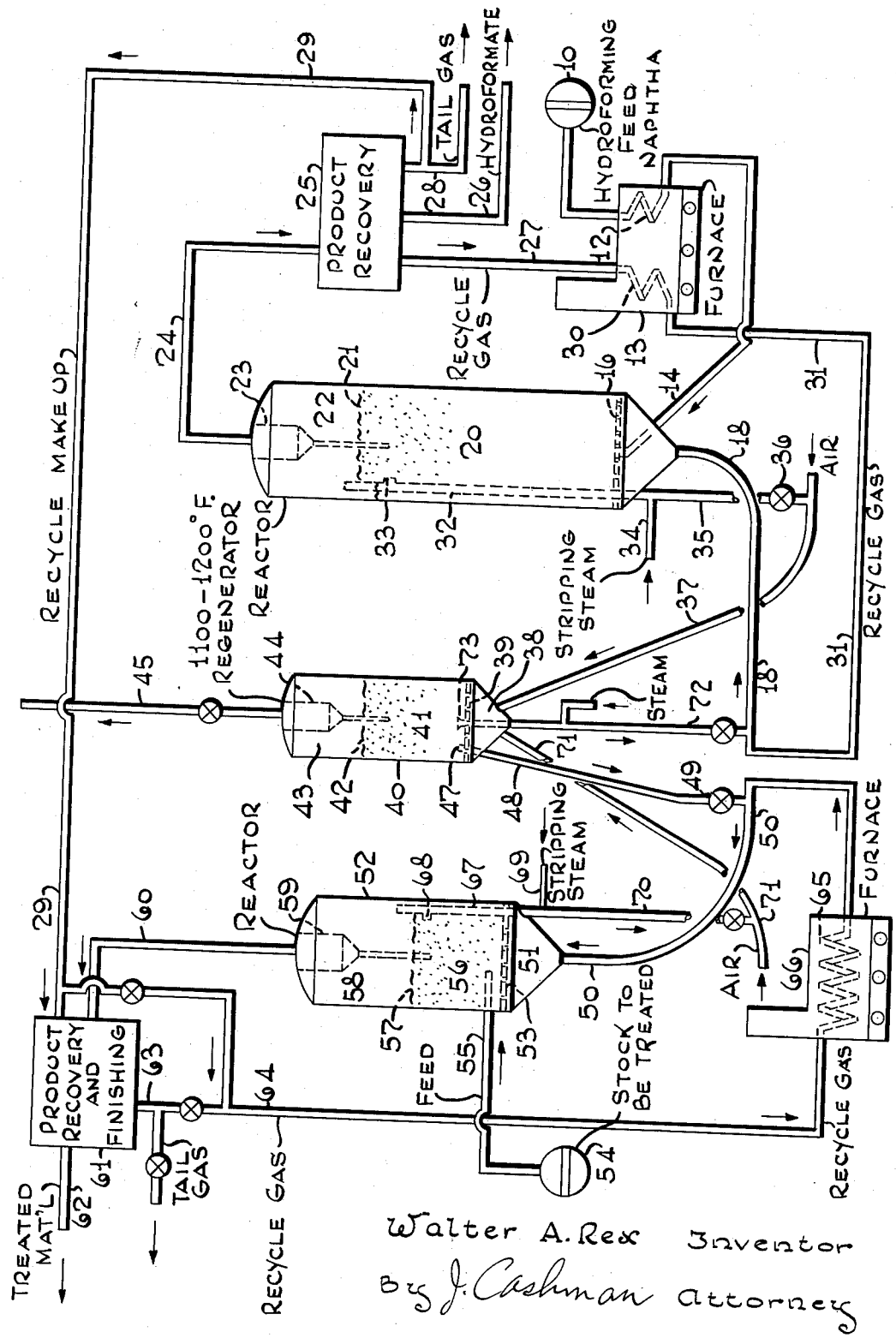

2,717,860
PROCESS FOR HYDROFINING AND HYDROFORMING HYDROCARBONS

Walter A. Rex, Westfield, N. J., assignor to Esso Research and Engineering Company, a corporation of Delaware Application February 2, 1951, Serial No. 209,151

11 Claims. (Cl. 196—36)

This invention relates to the catalytic conversion of hydrocarbon fractions boiling within the motor fuel range of low knock rating into high octane number motor fuels and particularly to a combination process whereby virgin naphtha fractions are subjected to hydroforming and thermally or catalytically cracked naphthas are subjected to a hydrofining treatment in the presence of the catalyst and hydrogen rich gas from the hydroforming operation.

Hydroforming is a well known and widely used method for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst and hydrogen whereby the hydrocarbon fraction is increased in aromaticity and in which operation there is no net consumption of hydrogen. Hydroforming operations are usually carried out in the presence of hydrogen, at temperatures of 750–1150° F. in the pressure range of about 50–1000 lbs. per sq. inch and in contact with such catalysts as molybdenum oxide, chromium oxide, tungsten oxide or, in general, oxides or sulfides of metals of groups IV, V, VI, VII and VIII of the periodic system of elements alone or generally supported on a base or spacing agent such as alumina gel, precipitated alumina or zinc aluminate spinel. A good hydroforming catalyst is one containing about 10 wt. per cent molybdenum oxide on an aluminum oxide base prepared by heat treating a hydrated aluminum oxide. A more heat stable base than said alumina may be prepared by combining aluminum oxide with zinc oxide, preferably in molecular proportions thereby forming a zinc aluminate spinel.

It has been proposed in application Serial No. 188,236, filed October 3, 1950, now U. S. Patent No. 2,689,823, to effect the hydroforming of naphtha fractions in a fluidized solids reactor system in which naphtha vapors in admixture with hydrogen-containing recycle gas are passed continuously through a dense fluidized bed of hydroforming catalyst particles in a reaction zone and spent catalyst is continuously withdrawn from the dense fluidized bed in the reactor vessel, stripped of entrained hydrogen and hydrocarbon vapors and transferred to a separate regeneration zone in which inactivating carbonaceous deposits are burned from the catalyst whereupon the regenerated catalyst particles are returned to the main reaction zone. Fluid hydroforming has several fundamental advantages over fixed bed hydroforming such as (1) the operations are continuous, (2) the vessels and equipment can be designed for single rather than dual functions, (3) the reactor temperature is constant a desideratum that cannot be achieved in fixed bed operations and (4) the regeneration or reconditioning of the catalyst may be readily controlled.

In a typical operation of the above mentioned fluid hydroforming process the reactor temperature is about 900° F., the regeneration temperature about 1150° F., the naphtha is preheated to about 950° F., the recycle gas is preheated to about 1185° F., the recycle gas rate is about 3000 cu. ft. per barrel and the catalyst to oil weight ratio is 1. In such an operation an excess amount of heat amounting to about 50–200 B. t. u. per lb. of feed naphtha depending on the severity of the operation is formed in the regenerator and must be removed to come into heat balance. It has been proposed to remove this excess heat by arranging heat exchange coils within the dense bed in the regenerator through which water is passed to form process steam.

It is the object of this invention to provide the art with an improved method for utilizing the excess amount of heat formed in the regenerator of a fluid hydroforming reactor system.

It is also an object to utilize this excessive heat of regeneration from a fluid hydroforming reactor system as well as excess hydrogen-rich process gas to effect improvement in thermally or catalytically cracked naphthas or other refinery stocks.

These and other objects will appear more clearly from the detailed specification and claims which follow.

In accordance with the present invention a virgin naphtha is subjected to hydroforming in a fluidized solids reaction zone, catalyst is continuously withdrawn from the reaction zone and discharged into a fluidized solids regeneration zone wherein inactivating carbonaceous deposits are burned off of the catalyst. A stream of catalyst is withdrawn from the regeneration zone and discharged into a fluidized solids treating zone to which there is supplied a stream of thermally or catalytically cracked naphtha or the like as well as a stream of excess hydrogen rich process gas from the hydroforming process in order to improve the engine cleanliness quality and stability of the said thermally or catalytically cracked naphtha. Catalyst is withdrawn from the fluidized solids treating zone, returned to the regenerator zone where carbonaceous deposits are burned off. Another stream of catalyst particles is withdrawn from the regenerator and returned to the fluidized solids hydroforming zone. By providing the fluidized solids treating vessel it is possible not only to utilize excess heat formed in the regenerator to effect an improvement in the properties of other refinery streams while simultaneously controlling the temperature of the catalyst undergoing regeneration, but also to utilize constructively the excess hydrogen rich process gas from the hydroforming operation which, as tail gas, is normally flared or used as fuel.

When included in finished gasoline without treating, the refinery streams previously mentioned, especially thermally reformed naphthas and heavy naphthas from catalytic cracking, are known to contribute greatly to the formation of varnish-like deposits in gasoline engines which often shorten the useful life of the engines. In some cases these streams are presently treated with sulfuric acid, but this is a very expensive operation because of the unselective nature of the acid treating resulting in excessive loss of valuable products. Another method which has been used to treat the streams is to pass the material over activated clay or bauxite. However, this method is also quite expensive and requires the installation of separate regeneration facilities and handling equipment for the solid contacting material. As described hereinafter, the present invention more effectively and more economically treats these poor quality refinery streams by contacting them with the hydroforming catalyst in the presence of hydrogen-rich gas, thereby selectively removing the deposit-forming constituents and producing high-quality gasoline blending stocks. The treated stocks are further improved by the removal of about 75–95% of the sulfur compounds contained in the original material thus increasing the leaded octane rating of the finished gasoline blend.

Reference is made to the accompanying drawing illustrating a diagrammatic flow plan of the process in accordance with the present invention.

In the drawing, 10 is a line supplying hydroforming feed stocks which may be virgin naphtha, Fischer-Tropsch naphtha or the like. This feed stock is passed via line 11 through preheating coils 12, arranged in furnace 13 and thence through line 14 to distributor nozzles in the lower part of hydroforming reactor vessel 15. The reactor 15 is provided with a perforated plate or distributor grid 16 near its bottom. The reactor is charged with finely divided hydroforming catalyst suspended in hydrogen rich recycle gas through line 18, the grid 16 serving to distribute the incoming catalyst and gas uniformly over the entire cross section of the vessel 15. The superficial velocity of the naphtha vapors introduced via line 14 and the recycle gas introduced via line 18 is so controlled that a dense, fluidized, liquid simulating bed 20 of catalyst particles and reactants is formed in the lower part of the reactor vessel. The dense, fluidized bed 20 has a definite level 21 and is superposed by a dilute or disperse phase suspension 22 of entrained catalyst particles in reaction product vapors. The vaporous reaction products are removed overhead from the reactor vessel through one or more cyclone separators 23, or the like which serve to remove most of the entrained catalyst particles. Reaction products are withdrawn from the reactor through line 24 and are then passed to product recovery equipment shown generally at 25 from which hydroformate product is withdrawn through line 26. Hydrogen-rich process gas is removed through line 27 for recycle to the reactor 15 while the excess hydrogen-rich process gas which is not needed for recycle or to maintain pressure in the system is removed through line 28. Part, if not all this excess hydrogen-rich process gas is passed to a treating reactor through line 29 as will be described below, while the remainder is discharged as tail gas to a flare or furnace in the event that it is needed as fuel. The recycle gas is passed through preheater coils 30 in furnace 13 and then through line 31 into inlet conduit 18.

A conduit 32 is arranged within reactor 15 and extending above the maximum bed level 21. An orifice 33 is provided in conduit 32 for the passage of catalyst directly from the dense bed 20 into conduit 32. Several orifices such as 33 may be provided at different levels in the conduit in order to control the level at which the catalyst is removed from the dense bed 20. It is advantageous to have the orifice 33 well up in the bed in order to cause the catalyst to travel at least the full depth of the bed before reaching the exit port. A stripping gas such as steam, nitrogen, flue gas or the like, is supplied to conduit 32 via line 34 in order to strip off adsorbed hydrocarbons and hydrogen from the catalyst particles so as to minimize the amount of combustibles carried to the regenerator by the catalyst. The conduit 32 is connected to conduit 35 and forms therewith a standpipe for creating sufficient fluistatic pressure to overcome the pressure drop taken by the catalyst passing through the regenerator 40. A valve 36 is provided near the bottom of the standpipe in order to control the discharge of catalyst therefrom into conduit 37 where the catalyst particles are picked up by a stream of air and conveyed into chamber 38 at the bottom of regenerator 40. A perforated plate or grid 39 is provided for distributing the air and catalyst uniformly over the entire cross section of the regenerator vessel. The superficial velocity of the air passing through the regenerator, including air supplied with another stream of catalyst as described below, is such as to form a dense, fluidized liquid simulating bed 41 of catalyst and air or regeneration gas having a definite level 42 and superposed by a disperse phase 43 of catalyst in regeneration gases. The regeneration gases are withdrawn from the disperse phase 43 passed through cyclone separators 44 or the like to recover and return the major part of the entrained catalyst whereupon the regeneration or combustion gases are discharged through flue 45 to the atmosphere. Catalyst particles separated in cyclones 44 are returned to the dense bed via the dip pipe attached to the cyclone. If desired or necessary heat exchange coils may be arranged in dense bed 40 and heat exchange fluid circulated therethrough in order to control the temperature of the catalyst undergoing regeneration. It is usually desirable to use only part of the air necessary for regeneration to convey the catalyst to the regenerator, the remainder of the air being supplied at spaced points in the regenerator or with the catalyst returned to regenerator 40 from treating vessel 52 as hereinafter described. In this way excessive burning in any one section and particularly the inlet conduit to the regenerator is avoided. It may also be desirable to supply the spent catalyst to the top of the regenerator and/or to effect regeneration in stages with countercurrent flow of catalyst and regeneration gas.

A well 47 forming the inlet to standpipe 48 is arranged just above the grid 39 for the withdrawal of a stream of catalyst from the dense fluidized bed 41 in the regenerator. Catalyst is discharged from standpipe 48 through control valve 49 into conduit 50 where it is picked up by the stream of excess hydrogen-rich process gas withdrawn from hydroformate product recovery through line 29.

The conduit 50 discharges into an inlet chamber 51 in the bottom of treating reactor vessel 52. A perforated plate or grid 53 is arranged above the inlet chamber to insure uniform distribution of incoming catalyst and hydrogen-rich process gas over the entire cross section of reactor 52. A feed stock such as a thermally or catalytically cracked naphtha, a virgin naphtha from sour crudes or a heating oil stock is supplied from line 54 and introduced via line 55 into the treating reactor 52 preferably through suitable distributor nozzles arranged just above grid 53. The feed stock may be preheated prior to its introduction into the treating reactor, the amount of preheat depending upon the overall heat balance of the plant, i. e., the amount of feed it is desired to treat, the amount and temperature of the hydrogen-rich process gas supplied to treating vessel 52, and the amount of heat supplied by the circulating catalyst from regenerator 40, which is in turn dependent upon the severity of the hydroforming operation. The superficial velocity of the hydrocarbon vapors and hydrogen-rich recycle gas through reactor 52 is so controlled as to form a dense, fluidized liquid simulating bed 56 of catalyst suspended in gaseous and vaporous reactants. The dense bed 56 has a definite level 57 and is superposed by a dilute phase 58 of entrained catalyst particles in reaction product vapors and gases. The reaction products are taken overhead from reactor 52 through cyclone separators 59 which serve to separate most of the entrained catalyst and return the same to the dense bed via the dip leg attached thereto. The reaction products substantially free of catalyst are then passed to suitable product recovery or finishing equipment shown generally at 61 wherein they are separated into treated normally liquid products which are removed through line 62 and a hydrogen-containing gas removed through line 63. This gas may either be sent to a flare or burned as fuel in a furnace or it may in whole or part be recycled through line 64 in admixture with make-up recycle gas from line 29 to preheat coils 65 in furnace 66 and thence to the inlet conduit 50 where it serves to pick up catalyst particles discharged from standpipe 48 and convey the same into treating reactor 52.

A conduit 67 is arranged within the reactor 52 and extending above the maximum bed level 57 therein. An orifice 68 is provided for the passage of catalyst directly from the dense bed 56 into conduit 67. A stripping gas such as steam, nitrogen, flue gas or the like is introduced into conduit 67 through line 69 in order to strip off hydrocarbons and hydrogen adsorbed by the catalyst particles. The conduit 67 is connected to conduit 70 and forms therewith a standpipe for creating sufficient fluistatic pressure to overcome the pressure drop taken by the catalyst passing from treating reaction vessel 52 through regenerator 40. The catalyst particles are discharged from the base of the conduit 70 into conduit 71 through which a stream of air is passed which carries the catalyst particles into inlet chamber 38 and thence through distributor grid 39 into the dense fluidized bed 41 in regenerator 40.

A conduit 72 having a well or cup-like inlet end 73 arranged within the dense fluidized bed 41 is provided for withdrawing a stream of regenerated catalyst from the dense bed and transferring it to hydroforming reactor 15. The conduit 72 constitutes a standpipe for creating sufficient fluistatic pressure to overcome the pressure drop taken by the catalyst passing from regenerator 40 through the dense bed 20 in reactor 15. The catalyst is discharged from the base of conduit 72 into conduit 18 where it is picked up by a stream of heated recycle gas and conveyed by said gas into the base of reactor 15 and through distribution grid 16 into the dense, fluidized bed 20.

The method of operation in accordance with the present invention is as follows:

The feed stock to hydroforming reactor 15 supplied through line 10 is a naphtha having a boiling range between about 175 and 450° F. and is preferably a virgin naphtha with a boiling range of 200–400° F. The feed stock is preheated by indirect heat exchange which hot reaction products to 500–600° F. and then further heated in furnace 13 to 800–1000° F., preferably about 950° F. The naphtha preheat should be as high as possible while avoiding thermal degradation.

The recycle gas contains about 50–70 vol. per cent, of hydrogen and should be preheated by indirect heat exchange with hot reaction products and by indirect heat exchange in furnace 13 to temperatures of about 1100–1200° F., preferably about 1185° F. The recycle gas is preheated to these temperatures in order to maintain the reactor temperature at the desired level. The recycle gas should be circulated through the hydroforming reactor at a rate of from 1000 to 4000, preferably about 3000 cu. ft. per bbl. of feed.

The reactor temperature should be between 850 and 950° F., preferably about 900° F. and reactor pressure should be between 100 and 500 lbs. per sq. inch, preferably about 200 lbs. per sq. inch. Temperatures above 900° F. result in increased carbon formation and lower selectivity to gasoline fractions while at temperatures below 900° F. operating severity is low and would therefore require an excessively large reaction vessel. Lowering reactor pressure below 200 lbs. per sq. inch results in increased carbon formation, which becomes excessive at pressures below about 75 lbs. per sq. inch. Above 200–250 lbs. per sq. inch, however, catalyst selectivity to light products ($C_4$'s) increases rapidly.

The catalyst charged to the system may be any of the usual hydroforming catalysts, preferably a group VI metal oxide upon a suitable base or support, for example one containing about 10% molybdenum oxide upon activated alumina. For proper fluidization the catalyst particles should, for the most part, be between 200 and 400 mesh in size or about 0–200 microns in diameter with a major proportion between 20 and 80 microns. The weight ratio of catalyst to oil introduced into the reactor or the rate of circulation of the catalyst between the reactor and regenerator relative to the feed rate of the oil should be about 0.5 to about 1.5, preferably about 1.0.

Space velocity, or the pounds of feed per hour per pound of catalyst in the reactor, depends upon the age or activity level of the catalyst, upon the characteristics of the feed stock and upon the characteristics desired in the product. Space velocity for a molybdenum oxide on alumina gel catalyst may vary, for example, from about 1.5 wt./hr./wt. (lbs. feed/hr./lb. catalyst) to about 0.15 depending upon the age or activity level of the catalyst, the characteristics of the feed stock and the desired octane number of the product. The temperature of the catalyst in regenerator 40 should be between 1050 and 1200° F.

The feed stock to the treating reactor 52 may be either a thermally cracked or catalytically cracked naphtha having a boiling range of 175–400° F. or it may be a virgin naphtha from sour crude or a heating oil stock to be processed for desulfurization and stability improvement. This feed stock may be heated by indirect heat exchange with hot reaction products from reactor 52 to about 300–500° F. It is usually unnecessary to supply additional preheat to the feed stock because the additional heat to raise the feed to treating temperature is supplied by the circulating catalyst and by the preheated hydrogen-rich gas.

The recycle gas supplied to reactor 52 should contain about 50–70 vol. per cent of hydrogen and may be preheated by indirect heat exchange with product vapors and in furnace 66 to temperatures of about 500–1000° F., preferably about 800° F. The recycle gas should be passed through treating reactor 52 at a rate of from about 500 to 2500, preferably about 1500 cu. ft. per bbl. of feed.

The temperature in the treating reactor 52 should be between 400 and 750° F. or substantially lower than the temperature in the hydroforming reactor while the treating vessel pressure should be essentially the same as in the hydroforming reactor or between 100 and 500 lbs. per sq. inch, preferably about 200 lbs. per sq. inch. The space velocity in treating vessel or reactor 52 should be somewhat higher than that used in the reactor 15 and should be about 0.5 to about 5.0 wt./hr./wt.

It may thus be seen that the present process integrates a treatment of thermally or catalytically cracked naphthas or naphthas from a sour crude for improving engine cleanliness, desulfurizing or improving stability with hydroforming of virgin naphtha stocks by the fluidized solids technique in which excess heat from the regenerator and excess recycle or tail gas is utilized effectively for upgrading the above mentioned refinery streams. The treatment of these streams is effected at lower temperatures and at higher space velocities than are customary for hydroforming. The treatment step in accordance with this invention differs from conventional clay and bauxite treating in that the process is carried out in the presence of hydrogen-rich recycle gas from the hydroforming section. The use of this recycle gas serves a three-fold purpose.

(1) The presence of hydrogen tends to suppress carbon formation when treating cracked stocks.

(2) The recycle gas permits the process to be carried out in vapor phase at lower temperatures because of its effect in lowering the partial pressure of the feed stock.

(3) It serves to bring about the selective hydrogenation of unstable constituents of cracked naphthas such as diolefins.

The circulation of catalyst from the hydroforming regenerator to the treating vessel not only allows the excess heat from the hydroforming reaction to be utilized in heating up the treating streams, but also furnishes a zone where carbonaceous and sulfurous deposits are oxidized from the catalyst.

The foregoing description contains a limited number of embodiments of the present invention but it will be understood that numerous variations are possible within the scope of the following claims.

What is claimed is:

1. A hydrocarbon conversion process which comprises treating a virgin naphtha in a primary reaction zone at elevated temperatures and pressures in contact with a fluidized bed of a finely divided hydroforming catalyst comprising a group VI metal oxide upon a support and in the presence of hydrogen, withdrawing reaction products and catalyst particles separately from said reaction zone, transferring the withdrawn catalyst to a regeneration zone, passing an oxygen-containing regenerator gas through a fluidized bed of catalyst particles in the regeneration zone to burn carbonaceous deposits from the catalyst particles, separating liquid product and process gases from the said reaction products, recycling a stream of catalyst from said regeneration zone to said primary reaction zone, recycling a portion of the process gases separated from the reaction products to the primary reaction zone in order to condition catalyst and maintain hydrogen partial pressure as well as total pressure in the primary reaction zone, withdrawing a second stream of catalyst from the regeneration zone and conducting the same into a fluidized bed of catalyst particles in a secondary treating zone, supplying a refinery stream requiring clean up to said secondary treating zone and supplying the excess of process gas not required for recycle to the primary reaction zone to the secondary treating zone, maintaining the pressure in the secondary treating zone the same as in the primary reaction zone, maintaining the temperature and the space velocity in the secondary treating zone lower than in the primary reaction zone and withdrawing a stream of catalyst particles from the secondary treating zone and recycling the same to the regeneration zone in admixture with air to burn carbonaceous deposits therefrom.

2. A hydrocarbon conversion process which comprises treating a virgin naphtha in a primary reaction zone at elevated temperatures and pressures in contact with a fluidized bed of a finely divided hydroforming catalyst comprising a group VI metal oxide upon a support and in the presence of hydrogen, withdrawing reaction products and catalyst particles separately from said reaction zone, transferring the withdrawn catalyst to a regeneration zone, passing an oxygen-containing regeneration gas through a fluidized bed of catalyst particles in the regeneration zone to burn carbonaceous deposits from the catalyst particles, separating liquid product and process gases from the said reaction products, recycling a stream of catalyst from said regeneration zone to said primary reaction zone, recycling a portion of the process gases separated from the reaction products to the primary reaction zone in order to condition catalyst and maintain hydrogen partial pressure as well as total pressure in the primary reaction zone, withdrawing a second stream of catalyst from the regeneration zone and conducting the same into a fluidized bed of catalyst particles in a secondary treating zone, supplying a refinery stream requiring clean up to said secondary treating zone and supplying the excess of process gas not required for recycle to the primary reaction zone to the secondary treating zone, maintaining the pressure in the secondary treating zone the same as in the primary reaction zone, maintaining the temperature and the space velocity in the secondary treating zone lower than in the primary reaction zone, withdrawing vaporous reaction products from the secondary treating zone separately from the catalyst, fractionating the reaction products to recover a liquid fraction and a normally gaseous fraction and recycling at least a portion of the gaseous fraction to said secondary treating zone.

3. A hydrocarbon conversion process which comprises treating a virgin naphtha in a primary reaction zone at temperatures between 850 and 950° F. and at pressures between 100 and 500 lbs. per sq. in. in contact with a fluidized bed of a finely divided hydroforming catalyst comprising a group VI metal oxide upon a support and in the presence of recycle gas containing 50–70 vol. per cent hydrogen, withdrawing reaction products and catalyst particles separately from said reaction zone, transferring the withdrawn catalyst to a regeneration zone passing an oxygen-containing regeneration gas through a fluidized bed of catalyst particles in the regeneration zone to burn carbonaceous deposits from the catalyst particles at temperatures of 1050–1200° F. separating liquid product and process gases from the said reaction products, recycling a stream of catalyst from said regeneration zone to said primary reaction zone, recycling a portion of the hydrogen-rich process gases separated from the reaction products to the primary reaction zone in order to condition catalyst and maintain hydrogen partial pressure as well as total pressure in the primary reaction zone, withdrawing a second stream of catalyst from its regeneration zone and conducting the same into a fluidized bed of catalyst particles in a secondary treating zone, supplying a refinery stream requiring clean up to said secondary treating zone and supplying the excess of hydrogen-rich process gas not required for recycle to the primary reaction zone to the secondary treating zone, maintaining a temperature of 400–750° F. in the zone, the same pressure and a lower space velocity in the secondary treating zone than in the primary reaction zone and withdrawing a stream of catalyst particles from the secondary treating zone and recycling the same to the regeneration zone in admixture with air to burn carbonaceous deposits therefrom.

4. A hydrocarbon conversion process which comprises treating a virgin naphtha in a primary reaction zone at temperatures between 850 and 950° F. and at pressures between 100 and 500 lbs. per sq. in. in contact with a fluidized bed of a finely divided hydroforming catalyst comprising a group VI metal oxide upon a support and in the presence of recycle gas containing 50–70 vol. per cent hydrogen, withdrawing reaction products and catalyst particles separately from said reaction zone, transferring the withdrawn catalyst to a regeneration zone, passing an oxygen-containing regeneration gas through a fluidized bed of catalyst particles in the regeneration zone to burn carbonaceous deposits from the catalyst particles at temperatures of 1050–1200° F., separating liquid product and process gases from the said reaction products, recycling a stream of catalyst from said regeneration zone to said primary reaction zone, recycling a portion of the hydrogen-rich process gases separated from the reaction products to the primary reaction zone in order to condition catalyst and maintain hydrogen partial pressure as well as total pressure in the primary reaction zone, withdrawing a second stream of catalyst from its regeneration zone and conducting the same into a fluidized bed of catalyst particles in a secondary treating zone, supplying a refinery stream requiring clean up to said secondary treating zone and supplying the excess of hydrogen-rich process gas not required for recycle to the primary reaction zone to the secondary treating zone, maintaining a temperature of 400–750° F. in the secondary treating zone, the same pressure and a lower space velocity in the secondary treating zone than in the primary reaction zone, withdrawing vaporous reaction products from the secondary treating zone separately from the catalyst, fractionating the reaction products to recover a liquid fraction and a normally gaseous fraction and recycling at least a portion of the gaseous fraction to said secondary treating zone.

5. The process as defined in claim 1 wherein the refinery stream is a thermally cracked naphtha.

6. The process as defined in claim 1 wherein the refinery stream is a catalytically cracked naphtha.

7. The process as defined in claim 1 wherein the refinery stream is a virgin naphtha from sour crude.

8. The process as defined in claim 1 in which the hydroforming catalyst comprises molybdenum oxide upon an alumina support.

9. The process as defined in claim 2 in which the hydroforming catalyst comprises molybdenum oxide upon an alumina support.

10. The process as defined in claim 3 in which the hydroforming catalyst comprises molybdenum oxide upon an alumina support.

11. The process as defined in claim 4 in which the hydroforming catalyst comprises molybdenum oxide upon an alumina support.

References Cited in the file of this patent

UNITED STATES PATENTS

| | | |
|---|---|---|
| 2,410,891 | Meinert et al. | Dec. 8, 1944 |
| 2,417,308 | Lee | Mar. 11, 1947 |
| 2,426,903 | Sweeney | Sept. 2, 1947 |
| 2,450,724 | Grote | Oct. 5, 1948 |

OTHER REFERENCES

Helmers et al.: "Petroleum Processing," February 1948, pages 133–138.